Sept. 4, 1923.  
A. G. STEELE  
EGG BEATER  
Filed Nov. 16, 1922
1,467,205
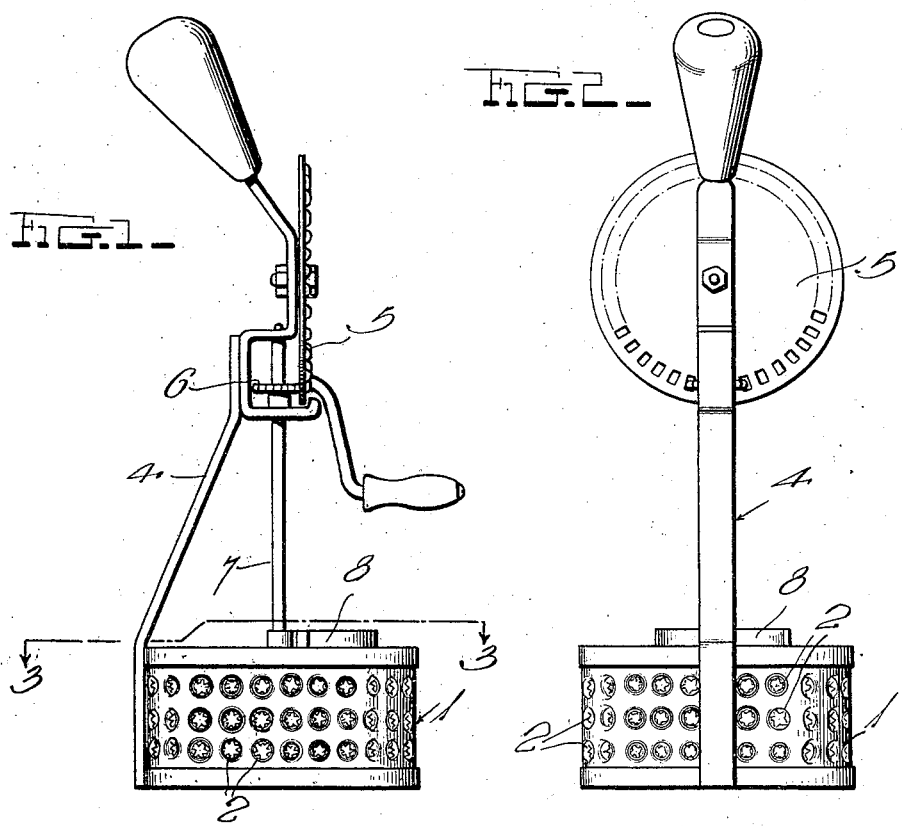
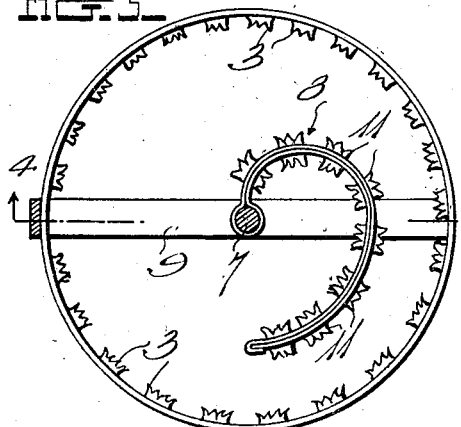
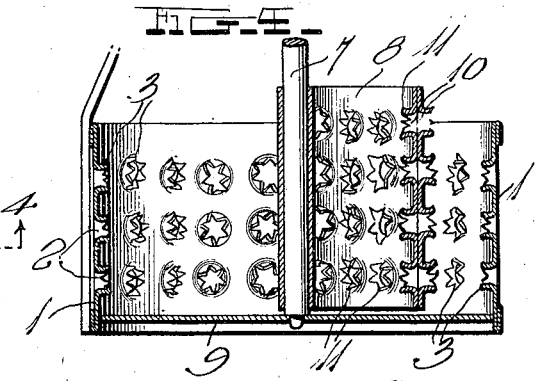
Witness  
H. Woodard
Inventor  
A. G. STEELE  
Attorneys Patented Sept. 4, 1923.

1,467,205

UNITED STATES PATENT OFFICE.

ARTHUR G. STEELE, OF RAWLINS, WYOMING.

EGG BEATER.

Application filed November 16, 1922. Serial No. 601,358.

*To all whom it may concern:*

Be it known that I, ARTHUR G. STEELE, a citizen of the United States, residing at Rawlins, in the county of Carbon and State of Wyoming, have invented certain new and useful Improvements in Egg Beaters; and I do declare the following to be a full, clear, and exact description of the invention, such as will enable others skilled in the art to which it appertains to make and use the same.

My invention has for its object to provide an extremely simple and inexpensive egg beater, yet one which will more rapidly beat eggs, whip cream, or perform other similar operations, than the beaters now on the market.

With this object in view, the invention resides in the novel subject matter hereinafter described and claimed, the description being supplemented by the accompanying drawing.

Figures 1 and 2 are side elevations looking in different directions.

Fig. 3 is a horizontal section as indicated by line 3—3 of Fig. 1.

Fig. 4 is a vertical sectional view as indicated by line 4—4 of Fig. 3.

In carrying out my invention, I have found that a perforated plate provided with projecting teeth around its perforations, is an extremely efficient beater, whether used by itself on the end of a carrying handle, or if otherwise operated, or related with a relatively movable plate which may be of similar form.

In the form of construction shown, the numeral 1 designates a circular sheet metal wall which is provided with a plurality of perforations 2, these perforations being formed by pointed instruments, so that the metal is bent from one side of the wall to provide a plurality of projecting prongs 3 around each perforation 2. A suitable carrying frame 4 is provided for the wall 1, as well as for intermeshing gears 5 and 6 and a shaft 7 which carries an agitator 8 located within the wall 1, the lower end of said shaft 7 being rotatable in a cross bar 9 having its ends secured to the wall 1 at diametrically opposite points.

The agitator 8 is preferably in the form of a pair of spiral plates secured in contact with each other, each plate being perforated as indicated at 10 and having projecting teeth 11 around the perforations, formed in the same manner as the teeth 3. While this construction is preferable, it will be understood that only one plate might be carried by the shaft, instead of providing two plates secured together.

By holding the wall 1 in a container for the contents to be beaten, and operating the gears to rotate the agitator 8, a beating or whipping action will be rapidly performed and this action will not require as much effort and time as the common forms of egg beaters now on the market, due to the provision of the perforations and the projecting teeth.

The grater-like projections in the device, referred to herein as prongs or teeth 3 and 11, form countless, sharp, jagged, keen cutting edges, as compared with the smooth blades or wires in similar devices heretofore used, such as egg beaters, cream whippers and the like. These parts 3 and 11 have the faculty of separating the individual cells quickly and successfully, allowing the atmospheric pressure to force air between the original cells, thus forming minute air chambers and accomplishing the desired end, that is creating a froth or foam.

As excellent results may be obtained from the details disclosed, they may be followed if desired, but within the scope of the invention as claimed, numerous minor changes may be made.

I claim:—

1. A beater comprising a perforated plate having a plurality of teeth around each of its perforations.

2. A beater comprising a pair of relatively movable members in close relation with each other, one of said members being in the form of a perforated plate having teeth around each of its perforations.

3. A beater comprising a perforated wall to surround an agitator, said wall having projecting teeth around each of its perforations.

4. A beater comprising a perforated spiral plate and a carrying shaft therefor, said plate having projecting teeth around each of its perforations.

5. A beater comprising a perforated vertically disposed annular wall, a perforated spiral plate within said wall, and a carrying shaft for said plate extending axially of said wall, said plate and wall having a plurality of teeth around each perforation, the teeth of the wall extending toward the teeth of the plate and vice versa.

6. A beater comprising a stationary annular wall vertically disposed and having portions struck inwardly to provide openings and a plurality of inwardly extending agitating teeth around each opening, a rotary shaft extending axially of said wall and surrounded by the wall, and a strip bent intermediate its length about said shaft within said wall and having its end portions extended in contacting relation and curved longitudinally to provide a spirally disposed movable beater, the end portions of said strip being punched to provide openings and a plurality of agitating teeth about the openings.

7. A beater comprising a stationary annular wall vertically disposed and having portions struck inwardly to provide openings and a plurality of inwardly extending agitating teeth around each opening, a rotary shaft extending axially of said wall and surrounded by the wall, and a strip carried by said shaft and extending spirally therefrom within said wall and constituting a movable beater, said strip being punched to provide openings and a plurality of agitating fingers around each opening.

8. A beater comprising an annular wall having portions punched inwardly to provide openings and a plurality of agitating teeth around each opening, a rotary shaft extending axially of said wall and surrounded by said wall, and a spiral strip extending from said shaft within said wall and disposed in a plane parallel to the plane of the wall.

9. A beater comprising an annular wall, a rotary shaft extending axially of said wall and surrounded by said wall, and a spiral strip extending from said shaft within said wall and disposed in a plane parallel to the plane of the wall, said strip being punched to provide openings and a plurality of agitating teeth about each opening.

10. A beater comprising an annular wall having portions punched inwardly to provide openings and a plurality of agitating teeth about each opening, a shaft extending axially of said wall and surrounded by said wall, and a spiral strip extending from said shaft within said wall and disposed in a plane parallel to the plane of the wall said strip being punched to provide openings and a plurality of agitating teeth about each opening.

In testimony whereof I have hereunto affixed my signature.

ARTHUR G. STEELE.